Figure 1:
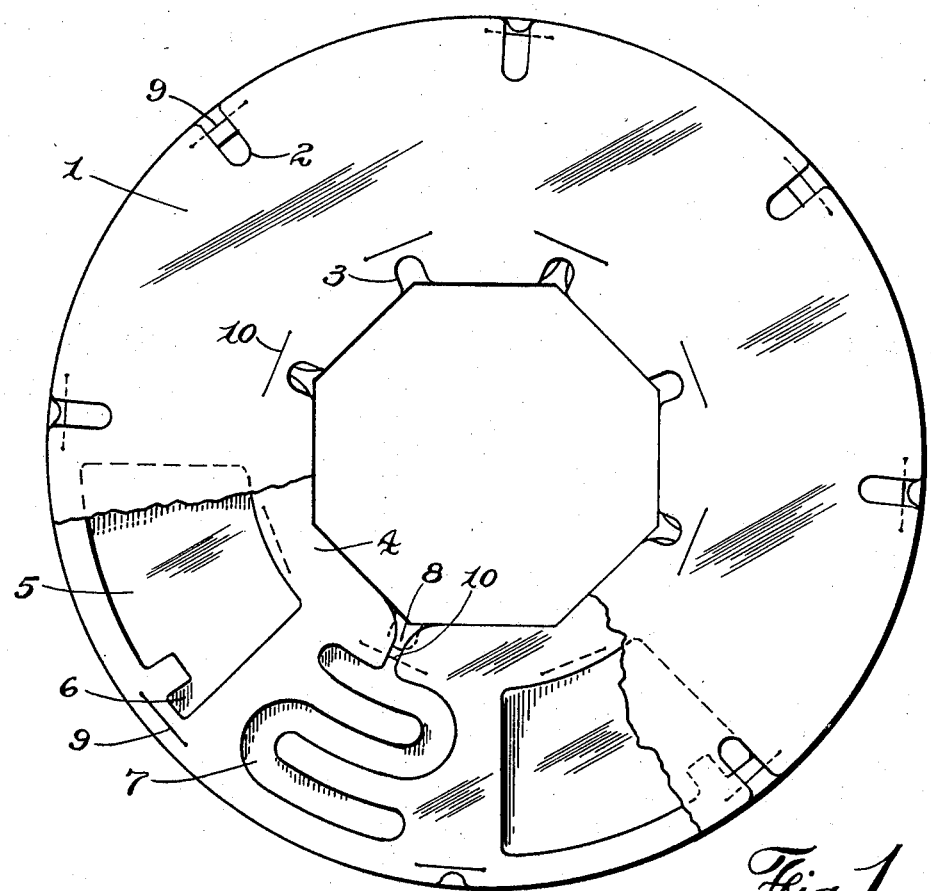

Feb. 4, 1969  H. WILANSKY  3,425,563

FILTER CARTRIDGE

Filed June 8, 1966

WITNESS:
Esther M. Stockton

INVENTOR.
Harold Wilansky
BY Clinton S. Jones
ATTORNEY

United States Patent Office 3,425,563
Patented Feb. 4, 1969

3,425,563
FILTER CARTRIDGE
Harold Wilansky, Big Flats, N.Y., assignor to The Hilliard Corporation, Elmira, N.Y., a corporation of New York
Filed June 8, 1966, Ser. No. 561,656
U.S. Cl. 210—492    3 Claims
Int. Cl. B01d 25/16, 27/08

The present invention relates to a filter cartridge for removing suspended foreign matter from circulating lubricant, and more particularly to that type of cartridge composed of a stack of filter discs with intercalated spacer discs forming a hollow cylindrical package through which the lubricant to be clarified is caused to flow in a radial or contra-radial direction, as described in the patent to Proulx 2,687,805 issued Aug. 31, 1954, and assigned to the assignee of the present invention.

The present invention is an improvement relating to the structure disclosed in the application of Proulx, Ser. No. 485,055, filed Sept. 3, 1965 now Patent No. 3,360,133 and also assigned to the assignee of this application.

The disclosure of the above identified application of Proulx relates to the problem of reduction in effectiveness of the filter cartridge due to channeling of the filter discs adjacent the outlet ports of the spacer discs when the cartridge is permitted to remain in service substantially beyond the recommended maximum use before replacement. The wire stitch reinforcements of the filter discs, bridging the outlet ports of the spacer discs, as disclosed by Proulx, have cured this channeling condition even under pressure differentials substantially higher than the recommended maximum.

It has been found, however, that if the lubricant to be clarified is contaminated with water, a different kind of failure of the cartridge may occur. Such contamination may be the result of condensation of water vapor during periods of shut down or by leakage from the cooling system of an internal combustion engine due to a faulty gasket or the like.

The spacer discs are formed of a mixture of cotton fibre and cellulose fibre which is coagulated from an aqueous vehicle. These fibres are of a hygroscopic nature, tending to absorb and retain any water entrained in the contaminated liquid. The water so absorbed swells and softens the spacer discs, causing their edge portions to expand into and clog the inlet ports in the filter discs. The consequent resistance to flow of lubricant into the cartridge causes the external pressure to build up and augment the intrusion of the softened portions of the spacer discs into the inlet ports of the filter discs until warping or wrinkling of the discs takes place, opening radial passages between the discs suddenly permitting substantially free flow of the lubricant, loaded with accumulated sludge and grit. This occurrence can quickly have a disastrous effect on the bearing surfaces of the unit being lubricated.

It is an object of the present invention to provide a novel filter cartridge of the above described type which is effective in operation over extended periods of use even when the liquid to be clarified is contaminated with entrained water.

It is another and more specific object to provide such a filter cartridge incorporating means for preventing the portions of the spacer discs adjacent the inlet ports of the filter discs from expanding into and clogging said inlet ports when softened by absorbed moisture.

Figure 2:
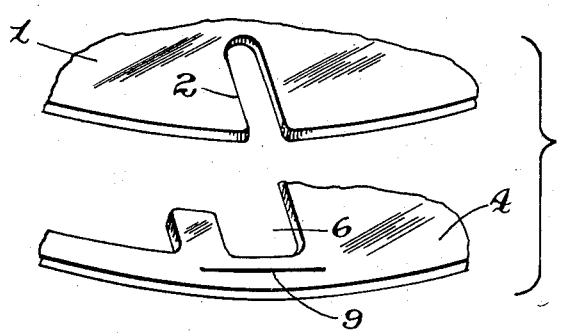

Further objects and advantages will be apparent from the following description, taken in connection with the accompanying drawing, in which:

FIGURE 1 is a top plan view of a stack of discs, the top filter disc being cut away to show a portion of the contiguous spacer disc and adjacent filter disc; and FIGURE 2 is a detail in perspective on an enlarged scale of portions of a filter disc and a subjacent spacer disc, the discs being separated to show the alignment of the inlet ports of the filter discs with the inlet passages of the spacer discs.

In FIGURE 1 there is shown an annular filter disc 1, of suitable foraminous material, having a plurality of equally spaced inlet ports 2 extending radially inward from its periphery, and an equal number of outlet ports 3 formed as indentations in its inner boundary. As here shown there are eight inlet and eight outlet ports, and the inner boundary of the disc is octagonal to secure orientation of the discs when they are assembled on an octagonal assembly mandrel.

Contiguous annular spacer discs 4 are provided with four keystone shaped cut-out spaces which, when enclosed by the adjacent filter discs 1, form inlet cells or chambers 5 having inlet passages 6 registering with the inlet ports 2 of the filter discs. The spacer discs 4 are also provided with four sinuously shaped cut-out spaces forming, with the adjacent filter discs, outlet chambers or cells 7 having outlet passages 8 registering with the outlet ports 3 of the filter discs. The inlet and outlet chambers are spaced alternately around the spacer discs 4, and the inner boundaries of the spacer discs are octagonal to secure proper orientation in assembly, each spacer disc being angularly displaced through 45° with respect to the next in the assembly.

In accordance with commercial practice, the filter discs are composed of fibre derived from cotton, while the separator discs are formed of a composition of cotton fibre and cellulose fibre. As previously stated, the fibres have an affinity for water, and if the liquid to be clarified is contaminated with water, this moisture will be selectively absorbed by the fibres, causing the material of the separator discs to soften and swell, and thereby tend to obstruct the inlet ports 2 and thus prevent the turbid liquid from entering the filter, with the undesirable results above pointed out.

As here disclosed, applicant has provided means for preventing such action in the form of wire staples or clasps 9 inserted circumferentially in the separator discs in position to register with the inlet ports 2 of the filter discs and restrain the swelling and intrusion of the material of the separator discs at these critical areas. It is also preferred to include wire reinforcing means 10 as disclosed by Proulx supra bridging the outlet passages 8 of the separator discs to prevent channeling of the filter discs and consequent reduction in effectiveness of the filter.

In a typical commercial form of filter cartridge of the above described character, it has been found as a result of programs of life tests, that when no reinforcements of any kind are incorporated at either the inlet or outlet ports of the discs, break down of the filtering action may occur by channeling action at the outlet ports as described in the application of Proulx above referred to, when the pressure drop through the cartridge goes substantially above 25 pounds per square inch.

When the reinforcements disclosed by Proulx are incorporated in the filter discs adjacent the outlet passages of the spacer discs, if the oil being filtered is free from entrained moisture, the effectiveness of the filter is maintained even when the collected solid contaminents have caused the pressure drop through the filter to equal and exceed 70 p.s.i. differential. If, however, there is a substantial amount of water entrained in the lubricant to be filtered, the clogging of the inlet ports of the filter discs by the softening and swelling of the adjacent portions of the spacer discs may cause the violent breakdown of the filter above described to occur at pressure drops as low as 40 p.s.i. differential.

When the discs are constructed as herein described, incorporating both the reinforcements in the filter discs adjacent the outlet passages of the spacer discs, and the reinforcements of the spacer discs adjacent the inlet ports of the filter discs, the disruptive type of failure of the cartridge due to water-contaminated oil is effectively prevented even when the pressure drop is permitted to increase to as much as 100 p.s.i. differential.

It will be understood that types of local reinforcements at the critical locations of the discs other than the specific form illustrated may be used, and the reinforcements may be incorporated in either the spacer discs or the filter discs, but the disclosed structure constitutes the preferred embodiment of the invention.

I claim:

1. A cartridge for filtering oily liquids which are contaminated with entrained immicible material including water, comprising a plurality of filter discs and a plurality of interposed spacer discs of foraminous material, said spacer discs having circumferentially arranged cut-out portions forming, with the adjacent filter discs, alternately arranged inlet and outlet cells, said inlet cells having inlet passages, said filter discs having inlet ports registering with said inlet passages, and means for preventing the material of the spacer discs adjacent said inlet ports from expanding into and clogging said ports, said means for preventing clogging of the inlet ports comprising stiffening means bridging said inlet ports.

2. A filter cartride as set forth in claim 1 in which said stiffening means is in the form of wire inserts extending circumferentially across said inlet ports.

3. A filter cartridge as set forth in claim 1 in which said stiffening means is in the form of circumferentially arranged staples inserted adjacent the outer periphery of the spacer discs, in position to bridge the inlet ports of the filter discs.

References Cited

UNITED STATES PATENTS

| | | | |
|---|---|---|---|
| 1,744,510 | 1/1930 | Hele-Shaw et al. | 210—488 |
| 2,601,521 | 6/1952 | Heftler | 210—488 |
| 2,604,994 | 7/1952 | Vocelka. | |
| 2,850,169 | 9/1958 | Briggs | 210—488 X |
| 2,856,076 | 10/1958 | Whipple. | |

REUBEN FRIEDMAN, *Primary Examiner.*

JOHN ADEE, *Assistant Examiner.*